J. E. HOLVECK.
CRANK SHAFT.
APPLICATION FILED FEB. 16, 1915.
1,223,071.
Patented Apr. 17, 1917.
2 SHEETS—SHEET 1.
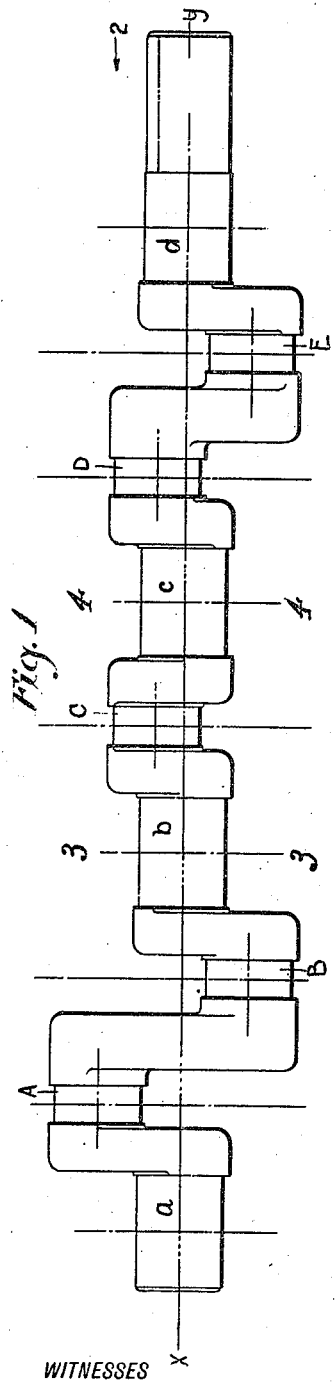
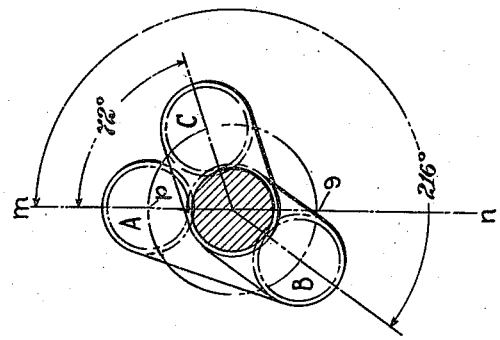
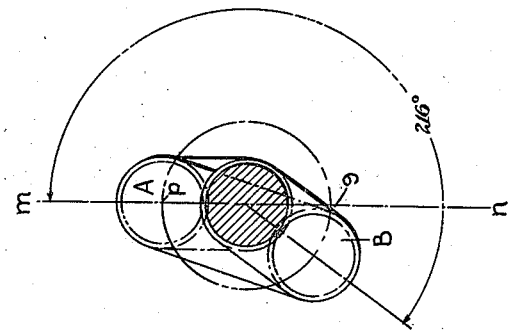
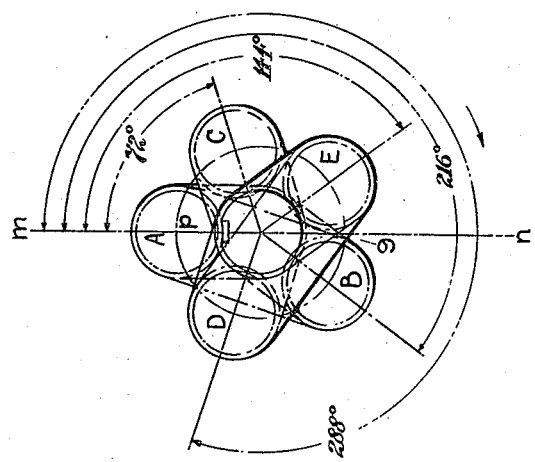
WITNESSES
INVENTOR
Joseph E. Holveck
BY
ATTORNEYS

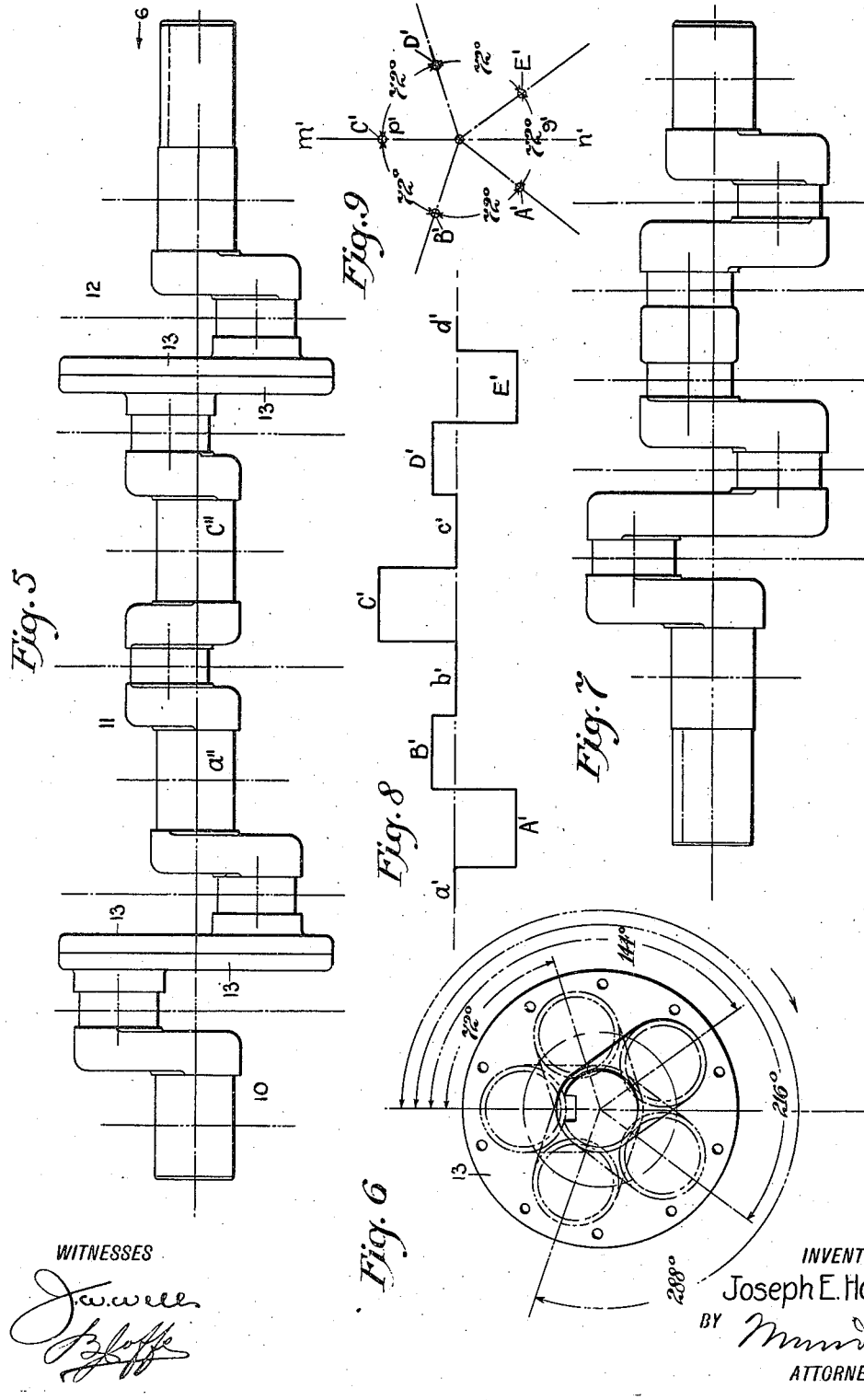

UNITED STATES PATENT OFFICE.

JOSEPH E. HOLVECK, OF PITTSBURGH, PENNSYLVANIA, ASSIGNOR TO THE ALDRICH PUMP COMPANY, OF ALLENTOWN, PENNSYLVANIA.

CRANK-SHAFT.

1,223,071.  Specification of Letters Patent.  Patented Apr. 17, 1917.

Application filed February 16, 1915. Serial No. 8,489.

*To all whom it may concern:*

Be it known that I, JOSEPH E. HOLVECK, a citizen of the United States, and a resident of Pittsburgh, in the county of Allegheny and State of Pennsylvania, have invented a new and Improved Crank-Shaft, of which the following is a full, clear, and exact description.

My invention relates to crank shafts, and the object thereof is to provide a crank shaft in which the angular relation of the cranks is such that the total load on all the bearings of the shaft is more evenly distributed than is possible with the crank shafts in use at present.

With the above and other objects in view, the nature of which will more fully appear as the description proceeds, the invention consists in the novel construction, combination and arrangement of parts as herein fully described, illustrated and claimed. In the accompanying drawings, forming part of the application, similar characters of reference indicate corresponding parts in all the views, and Figure 1 is a side elevation of a crank shaft embodying my invention;

Fig. 2 is an end view thereof in the direction of the arrow 2 in Fig. 1;

Fig. 3 is a section on line 3—3, Fig. 1;

Fig. 4 is a section on line 4—4, Fig. 1;

Fig. 5 is an elevation of a modified structure of the shaft;

Fig. 6 is an end view thereof in the direction of the arrow 6 in Fig. 5;

Fig. 7 is a side elevation of a further modification of my shaft; and

Figs. 8 and 9 are diagrammatic side and end elevations respectively of an ordinary crank shaft as used at present.

Before proceeding to a more detailed description of my invention, it must be clearly understood that although the crank shaft herein described and illustrated is mainly intended for use in connection with pumps, the same can be as efficiently used with internal combustion engines or other machinery utilizing crank shafts; and, further, although the description and illustrations refer to a quintuplex crank shaft, the same reasoning will apply to a crank shaft formed of more or fewer cranks.

Referring to Fig. 1, the crank shaft has four main bearings, $a$, $b$, $c$, and $d$, located on a common axis $x$—$y$, and five crank bearings A, B, C, D, and E, on the side of said axis. The crank bearings in the end elevation (see Fig. 2) are 72° apart. The crank bearing A is placed in the plane $m$—$n$ passing through the axis $x$—$y$. Measuring in a clockwise direction from said crank bearing A, the crank bearing B is at an angle of 216°; C is 72° from A; E is 144° from A; and D is 288° from A. That is to say, through the angular distance between the successive cranks clockwise they are 216° apart, and counter clockwise they are 144° apart. When the crank shaft is rotated, the successive cranks will pass successively a fixed point $p$ in the end elevation. That is to say, assuming that the crank shaft rotates in the direction of the arrow shown in Fig. 2, the crank B will pass the point $p$, not after the crank A has passed it, but after the crank D has passed the point $p$ in the plane $m$—$n$.

The usual way is to have the cranks in a five-crank shaft to pass a point $p'$ in the plane $m'$—$n'$ in the end elevation of Fig. 9 consecutively and not alternately, as the angular distance between the successive cranks is 72° in lieu of 144°. It will be seen from Fig. 9 that the cranks A′, B′, C′, D′, and E′ will pass the point $p'$ in the plane $m'$—$n'$ successively and that the angular distance from the crank A′ to the successive cranks increases in steps of 72° when measuring in clockwise direction and is 288° from the crank E′, while it is 144° in Fig. 2. In a pump the crank bearings pass through 180° on the discharge and on the suction strokes. The suction pressure cannot be more than 14.7 pounds; and the discharge pressure runs from 150 pounds per square inch in ordinary service to 10,000 pounds per square inch in hydraulic work. The greater part of the work comes, therefore, on the discharge stroke. The load on each bearing is the product of the pressure by the area of the plunger. Assuming the discharge stroke to be $p$—$q$ (see Figs. 2 to 4 inclusive) in the direction of rotation of the crank, and $q$—$p$ the suction stroke, the maximum load on the shaft is when three cranks are within 180° on the discharge stroke, like A, C, and E, Fig. 2, and the minimum when two crank bearings are within 180°.

The complete cycle of operation is as follows:

When crank bearings E and C are within 180° of the discharge stroke, the load will be carried by the bearings $b$, $c$, and $d$ (see Fig. 1). When the cranks E, C, and A are in the discharge semicircumference, the bearings $a$, $b$, $c$ and $d$ will carry the load. When the cranks C and A are in the discharge circumference, the bearings $a$, $b$, and $c$ will carry the load. When the cranks C, A, and D are within 180° of the discharge strokes, the bearings $a$, $b$, $c$, and $d$ will carry the load. When the cranks A and D are within 180° of the discharge stroke, bearings $a$, $b$, $c$, and $d$ will carry the load. When the cranks A, B, and D are within 180° of the discharge stroke, the bearings $a$, $b$, $c$, and $d$ will carry the load. When the cranks D and B are within 180° of the discharge stroke, bearings $a$, $b$, $c$, and $d$ will carry the load. When the cranks D, B, and E are within 180° of the discharge stroke, the bearings $a$, $b$, $c$, and $d$ will carry the load. When the cranks B and E are within the circumference of the discharge stroke, bearings $a$, $b$, $c$, and $d$ will carry the load. When the cranks B, E, and C are within 180° of the discharge stroke, the bearings $a$, $b$, $c$, and $d$ will carry the load.

The following table will at a glance show the load carried by the main bearings when any of the above-mentioned cranks are within 180° of the discharge stroke.

| Load on bearings. | Within 180° of the discharge stroke. | Load on bearings. |
|---|---|---|
| $a$—$b$—$c$—$d$ | EC | $b$—$c$—$d$ |
| $a$—$b$—$c$—$d$ | ECA | |
| $a$—$b$—$c$—$d$ | CA | $b$—$c$—$d$ |
| $a$—$b$—$c$—$d$ | CAD | |
| $a$—$b$—$c$—$d$ | AD | $a$—$b$—$c$—$d$ |
| $a$—$b$—$c$—$d$ | ADB | |
| $a$—$b$—$c$—$d$ | DB | $a$—$b$—$c$—$d$ |
| $a$—$b$—$c$—$d$ | DBE | |
| $a$—$b$—$c$—$d$ | BE | $a$—$b$—$c$—$d$ |
| $a$—$b$—$c$—$d$ | BEC | |

In all these cases the three loads are distributed over the four bearings $a$, $b$, $c$, and $d$, and two loads over three bearings $b$, $c$, $d$ and $a$, $b$, $c$ in two instances and over four bearings in three instances.

Considering the cycle of operation of a usual crank as shown in Fig. 8, it will be as follows:

| Load on bearings. | Within 180° of the discharge stroke. | Load on bearings. |
|---|---|---|
| $a'$—$b'$—$c'$ | C'B' | $a'$—$b'$—$c'$ |
| | C'B'A' | |
| | B'A' | $a'$—$b'$ |
| $a'$—$b'$—$c'$—$d'$ | B'A'E' | |
| | A'E' | $a'$—$b'$—$c'$—$d'$ |
| $a'$—$b'$—$c'$—$d'$ | A'E'D' | |
| | E'D' | $c'$—$d'$ |
| $b'$—$c'$—$d'$ | E'D'C' | |
| | D'C' | $b'$—$c'$—$d'$ |
| $a'$—$b'$—$c'$—$d'$ | D'C'B' | |

From this table it will be seen that with a maximum of three plungers the load is distributed over four bearings in three instances, and over three bearings in two instances. With two plungers operating within 180° of the discharge stroke, the load is distributed over two bearings in two instances and over three bearings in two instances, and four bearings in one instance.

It is evident from these tables, the description and the illustrations that my shaft has decided advantages over the usual crank shafts, as the load is more evenly distributed on the main bearings by means of my crank shaft than by the usual crank shaft. It also reduces vibration in the machine and the tendency of the frames to weave, due to the fact that the load is more evenly distributed through all of the main bearings.

In Fig. 5 a modified shaft is shown which differs from the structure in Fig. 1 insomuch that the same is formed of three parts, 10, 11 and 12, of which the part 11 has one flange 13 adapted to be connected to a corresponding flange 13 provided at one end of the parts 10. The flanges can be secured to each other in any suitable way. It will be noted that the part 11 of the crank shaft contains the main bearings $a''$ and $b''$ which simultaneously carry the load in any position of the cranks of the shaft, as can be easily seen from the first table.

In Fig. 7 the crank shaft is shown of a single piece and has only two main bearings, but the angular distance between the successive cranks is the same, that is, 216°; and they will alternately pass a fixed point in any elevation of the shaft in lieu of successively passing the same point, as the cranks in the ordinary crank shaft do.

From the foregoing description, taken in connection with the accompanying drawings, the advantage of the construction and operation of the crank shaft shown will be readily understood by those skilled in the art to which the invention pertains. I desire to have it understood that the shaft shown is merely illustrative and that such changes may be made as are within the scope of the appended claims.

I claim:
1. A crank shaft, the successive crank bearings of which are at an angle of 216° measuring in the direction of rotation.
2. A multiple crank-shaft comprising a series of alined main bearings and successive crank bearings which are at an angle of 216 degrees measured in the direction of rotation, as shown and described, whereby when two cranks are on the working stroke, at least three main bearings carry the load.

In testimony whereof I have signed my name to this specification in the presence of two subscribing witnesses.

JOSEPH E. HOLVECK.

Witnesses:
   JENNIE B. MCCORMICK,
   LYDIA B. MCKELVY.